Nov. 12, 1963

J. H. HOLLYDAY 3,110,392

THROWER-TYPE CONVEYOR

Filed Nov. 28, 1962

INVENTOR.
JAMES H. HOLLYDAY

BY

*Joseph A. Brown*

ATTORNEY

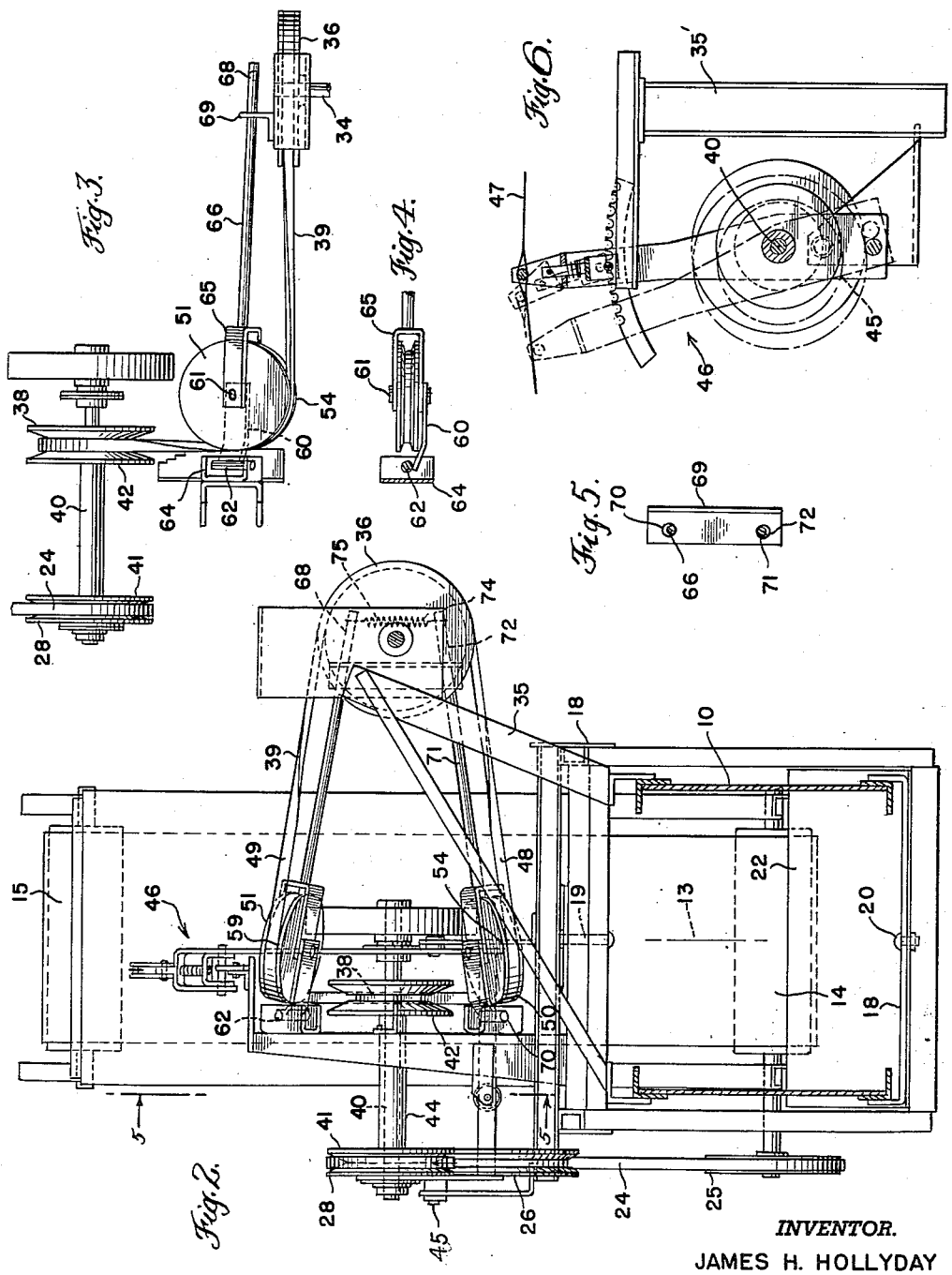

United States Patent Office 3,110,392
Patented Nov. 12, 1963

3,110,392
THROWER-TYPE CONVEYOR
James H. Hollyday, New Holland, Pa., assignor to Sperry Rand Corporation, New Holland, Pa., a corporation of Delaware
Filed Nov. 28, 1962, Ser. No. 240,563
7 Claims. (Cl. 198—128)

The present invention relates generally to bale throwers and more particularly to a bale thrower mounted on the bale case of a baler for lateral swinging movement relative thereto to vary the direction of bale trajectory and driven by power from the baler through a sheave-belt drive arrangement. Still more specifically, the invention relates to an improved mounting means for a pair of idlers in such a drive.

One object of this invention is to provide, in a bale thrower of the character described, mounting means for idlers whereby the planes in which the idlers rotate change responsive to lateral swinging movement of the thrower on the bale case of the baler.

Another object of this invention is to provide, in a bale thrower of the character described, idler mounting means by which optimum positioning of a pair of idlers is maintained relative to a drive belt whereby wear on the belt as it passes over the idlers is minimized.

Another object of this invention is to provide an idler mounting structure which allows the plane of rotation of each idler to vary but without impairing the transmission of power to the thrower from the baler.

A further object of this invention is to provide, in a bale thrower of the character described, idlers which are supported by pivotal means on the thrower and slidable means on the bale case to achieve a desired shifting of the idlers on lateral swinging of the thrower.

A still further object of this invention is to provide an idler mounting structure of the character described which is relatively low in cost and simply designed.

Other objects of this invention will be apparent hereinafter from the specification and from the recital in the appended claims.

In the drawings:

FIG. 2 is a vertical section taken on the line 2—2 of FIG. 1 and looking in the direction of the arrows;

FIG. 3 is a fragmentary plan view showing the sheave-belt drive arrangement and including the idler mounting structure of this invention;

FIG. 4 is a detailed side edge view of one end of the idlers and part of the mounting means therefor;

FIG. 5 is a side view of the bale case bracket of the idler mounting means; and

FIG. 6 is a side elevation showing the ratchet structure used in controlling the speed of the thrower.

Figure 1:
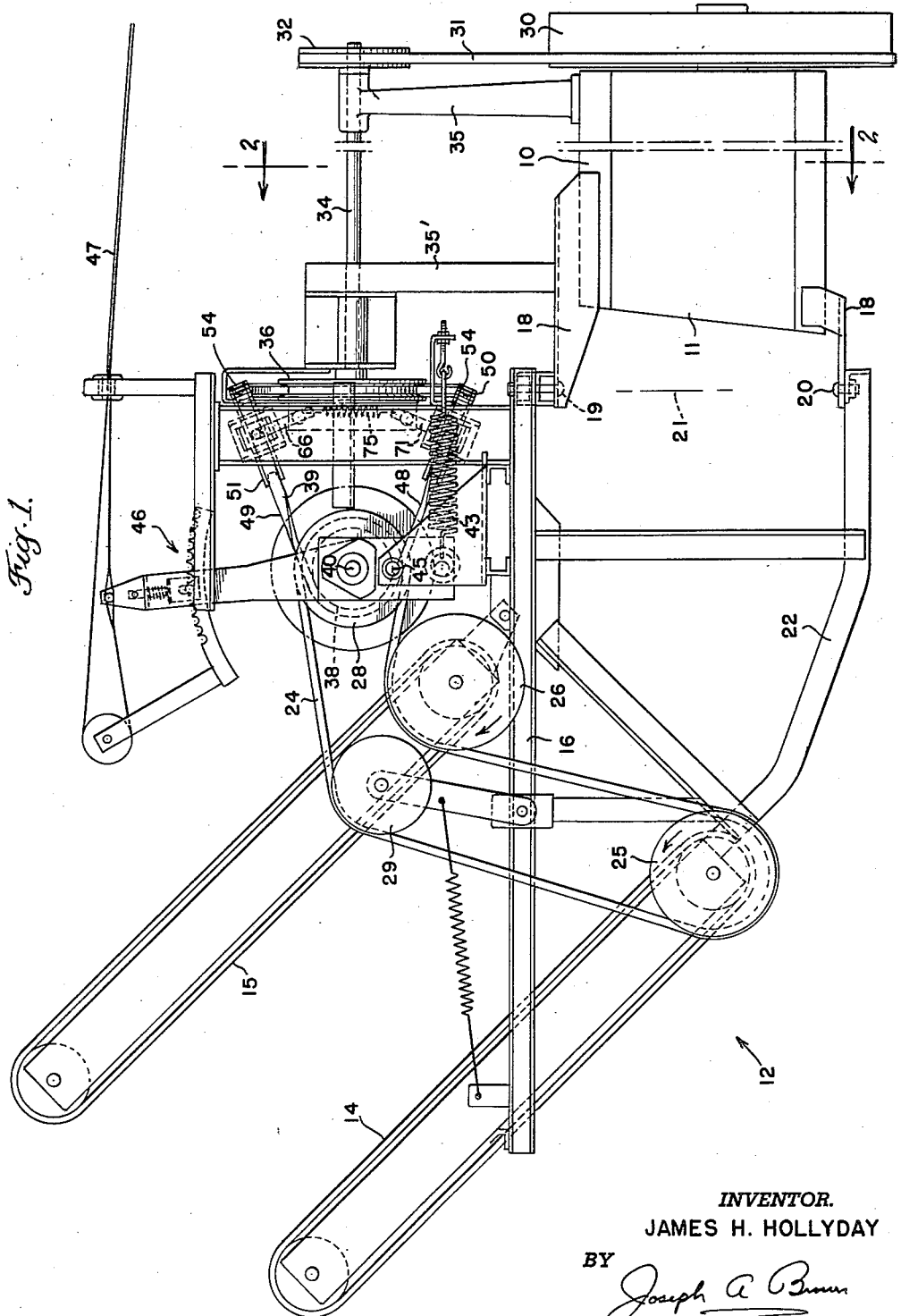
FIG. 1 is a side elevation of a bale thrower mounted on a baler bale case for lateral swinging movement relative thereto from a neutral position, as shown, and having drive means for operating the thrower including idler mounting means constructed according to this invention.

Referring now to the drawings by numerals of reference, and particularly to FIGS. 1 and 2, 10 denotes the bale case of a hay baler having a rearward or discharge end 11 from which successive bales emerge as the baler operates. The structure of the baler may be conventional and of the type employed in forming rectangularly shaped bales. Bale case 10 extends in a fore-and-aft direction relative to the travel of the baler, behind which a trailing wagon is adapted to be located to receive the bales from the baler. For depositing the bales in the wagon, a bale thrower 12 is provided constructed generally as shown in U.S. Patent No. 3,055,519 and comprising a lower endless conveyor 14 and an upper endless conveyor 15 which engage, respectively, the bottom and top of each discharged bale. When viewed as shown in FIG. 1, endless conveyor 14 continuously travels at high speed in a counterclockwise direction while conveyor 15 travels clockwise and at the same speed. Preferably, although not necessarily, the conveyors comprise endless belts having friction surfaces adapted to engage the bales and impart a throwing force thereto.

Conveyors 14 and 15 are mounted on a frame 16 connected by a pair of brackets 18 to the discharge end 11 of bale case 10. Brackets 18 extend, respectively, above and below bale case 10. Frame 16 is connected to the brackets by vertically aligned pivots 19 and 20 which provide a vertical pivot axis 21 about which the thrower is laterally swingable. The pivot axis is located in a vertical plane 13 (FIG. 2) centrally located relative to bale case 10. Swinging of the thrower is provided so that the direction in which bales are trajected may be varied. Such swinging may be produced by a link arm, not shown, as disclosed for example in U.S. Patent No. 3,055,519.

As shown in FIG. 1, the conveyors 14 and 15 extend parallel to each other and they are inclined in an upward rearward direction. A support pan 22 is provided to receive the bales as they are successively discharged from bale case 10 and to guide them to the thrower conveyors. For driving the respective conveyors, an endless belt 24 is provided which extends around a sheave 25 for the conveyor 14 and a sheave 26 for the conveyor 15. The sheaves 25 and 26 are rotated in opposite directions as indicated by the arrows thereon and power is transmitted to belt 24 by a sheave 28. A spring loaded idler 29 is provided, as shown, for keeping belt 24 tight and in driving relationship to sheaves 25 and 26.

For rotating sheave 28, the baler is used as a power source. The baler has a forwardly located flywheel 30 which is rotated from some source of power such as a power-take-off connection to the tractor used in towing the baler. The flywheel transmits power to the various operating components of the baler and a belt 31 is provided to take power from the flywheel for operating thrower 12. Belt 31 extends around the flywheel and around a sheave 32 connected to a fore-and-aft extending shaft 34. Shaft 34 is journalled on standards 35—35′, and at its rearward end the shaft is provided with a drive sheave 36. Mounted on thrower 12 for rotation about an axis transverse to the bale case 10 and extending in a vertical plane is a driven sheave 38 interconnected to drive sheave 36 by an endless belt 39. The drive sheave 36 is located in a given position relative to bale case 10 while driven sheave 38 moves relative to the bale case upon lateral swinging of the thrower.

Driven sheave 38 is supported on a shaft 40 which is coaxial with sheave 28 for belt 24. Sheave 28 and driven sheave 38 are both split sheaves, having halves 41 and 42, respectively, interconnected by a sleeve 44. Shaft 40 is supported for fore-and-aft movement about a pivot 45 (FIG. 6) mounted on thrower frame 16. Ratchet control means 46 and cooperative spring 43 are provided for moving shaft 40 in such fore-and-aft direction and controlled by ropes 47. On forward movement of the shaft 40, driven sheave 38 closes while sheave 28 opens and on rearward movement of shaft 40 sheave 38 opens while sheave 28 closes, thereby providing a variable speed power drive to the conveyors 14 and 15. Such structure is not recited in more detail here since this invention relates to another portion of the drive means.

For guiding reaches 48 and 49 of belt 39 in its drive from drive sheave 36 to driven sheave 38, a pair of vertically spaced idlers are provided, namely lower idler 50 and upper idler 51. Each idler is rotatable about an axis which is located in the plane 13 through the longitudinal center of the bale case, when the thrower is in neutral position, extending directly rearwardly. The centers of the idlers are rearwardly of pivot axis 21 of thrower 12. Each idler has a peripheral portion 54 around which belt 39 extends and located generally in register with vertical pivot axis 21. The location of the idlers is such that when the thrower swings laterally, the belt length from drive sheave 36 to driven sheave 38 remains substantially constant and the power output to the thrower is not impaired responsive to lateral swinging of the structure.

Since the thrower swinging produces a movement of the driven sheave relative to the drive sheave 36, the extension of the drive belt 39 changes as the thrower swings laterally. To provide optimum operative relationship between belt 39 and idlers 50 and 51 regardless of the extension of belt 39, each idler is supported for rotation about a plane which is variable responsive to lateral swinging of the thrower. When in neutral operating position with the thrower extending directly rearwardly, lower idler 50 is inclined in an upward rearward direction while upper idler 51 is inclined in a downward rearward direction. As shown best in FIGS. 3, 4 and 5, the mounting for idler 51 comprises a bracket 60 which provides support for a generally vertically extending pivot 61 for the idler. Bracket 60 is connected to a pin 62 which is in turn rotatably supported on a fixed U-shaped channel member 64. Pin 62 extends transverse to idler pivot 61 and pin 62 is located in a plane common with the plane of the idler. Pin 62 provides an axis about which idler 51 is pivotal to change the plane of rotation thereof.

A U-shaped bracket 65 straddles idler 51 from the side opposite bracket 60 and it is pivotally connected to pivot pin 61. Bracket 65 has connected to it one end of a rod 66 while the opposite end 68 of the rod extends through a bracket 69 affixed to rearward standard 35' on bale case 10. An enlarged hole 70 is provided in bracket 69 as shown in FIG. 5 whereby the end 68 of the rod may shift longitudinally relative to the bracket. Thus, idler 51 is supported at one side thereof by pivot means in form of pin 62 and at its opposite end by the rod 66. When bale thrower 12 is swung laterally from its neutral position, rod 66 slides through hole 70 in bracket 69 and the end 65 of the rod pivots relative to the idler. At the same time, the engagement of rod 66 with bracket 69 causes idler 51 to pivot about pin 62. As the extension of belt 39 changes when the thrower swings laterally, idler 51 follows the belt and its plane of rotation changes so that it remains in optimum operating position with the belt at all positions of the thrower.

The lower idler 50 is mounted the same as idler 51 and operates similarly. The lower idler has a pin 70 and a rod 71 connected to the idler the same as pin 62 and rod 66 for the idler 51. Rod 71 extends through enlarged hole 72 of bracket 69 and its outer free end 74 is connected to the outer free end 68 of the rod 66 by a spring 75. Spring 75 biases the respective rod end toward each other and into engagement with bracket 69 so that the rods will not rattle in the bracket when the thrower is operating.

The idler mounting described increases the operative life of drive belt 39 which is subjected to substantial forces since it is through this belt that the power is transmitted to operate the thrower. The transmission of such power is complicated by the lateral swinging movement of the thrower and resulting movement of belt 39. However, by having the idlers 50 and 51 supported in planes which vary as the thrower swings, a long life of the belt 39 is provided and thus long operative life of the drive mechanism for the thrower.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination, a baler having a bale case, a bale thrower at a discharge end of said bale case to receive bales therefrom and throw them away from the baler, means mounting said thrower on said bale case for lateral swinging movement about a vertical pivot axis and to each side of a neutral position whereby the direction of throw is variable, said pivot axis being located along a plane generally through the longitudinal center of said bale case, drive means on said baler, a drive sheave rotatably mounted on said bale case and connected to said drive means, a driven sheave rotatably mounted on said thrower, the location of said driven sheave relative to said drive sheave changing responsive to lateral swinging movement of said thrower, an endless belt connecting said drive and driven sheaves and having a pair of spaced reaches, a pair of idlers located one above the other on said thrower and in spaced relation, each idler being rotatable about an axis in said plane when the thrower is in said neutral position, one reach of said endless belt extending around one of said idlers and the other reach around the other idler, each idler having a center spaced from said pivot axis on the side thereof toward the thrower and also having a particular portion adjacent the periphery thereof around which salt belt travels and located generally in vertical register with said thrower pivot axis, the length of belt travel from said drive sheave to said driven sheave and around said idlers remaining substantially constant when the thrower swings laterally whereby the drive to the thrower is unimpaired by such swinging, and means spaced and separate from said idler axes so mounting each idler on the thrower that the plane in which each idler rotates changes upon lateral swinging of the thrower and provides proper operative engagement of said belt with the idlers, said idler mounting means comprising a pivotal support for each idler on one side thereof and a slidable support for each idler on the side thereof opposite said one side.

2. The combination recited in claim 1 wherein the pivotal support for each idler is on one side of said bale case plane when the thrower is in said neutral position and the slidable support is located at the opposite side of the bale case plane.

3. The combination recited in claim 1 wherein each idler is supported for rotation in an inclined plane, the lower idler of the pair of idlers extending upwardly and away from said bale case and the upper idler extending downwardly and away from the bale case when the thrower is in said neutral position.

4. The combination recited in claim 3 wherein the pivotal support for each idler comprises a pivot pin extending transverse to the axis of its associated idler and in a common plane with the idler.

5. The combination recited in claim 1 wherein said slidable support for each idler comprises a rod extending transverse to said bale case, one end of the rod being connected to its associated idler for pivotal movement about its idler axis and the opposite end of the rod being slidably supported on a bracket affixed to the bale case.

6. The combination recited in claim 5 wherein a tension spring connects the rods of said idlers and biases the ends of the rods remote from the idlers toward each other.

7. In combination, a baler having a bale case, a bale thrower at a discharge end of said bale case to receive bales therefrom and throw them away from the baler, means mounting said thrower on said bale case for lateral swinging movement about a vertical pivot axis and to each side of a neutral position whereby the direction of throw is variable, said pivot axis being located along a plane generally through the longitudinal center of said bale case, drive means on said baler, a drive sheave rotatably mounted on said bale case and connected to said drive means, a driven sheave rotatably mounted on said thrower, the location of said driven sheave relative to said drive sheave changing responsive to lateral swinging movement of said thrower, an endless belt connecting said drive and driven sheaves and having a pair of spaced reaches, a pair of idlers on said thrower and rotatable about axes in said plane when the thrower is in said neutral position, one reach of said endless belt extending around one of said idlers and the other reach around the other idler, each idler having a center spaced from said pivot axis on the side thereof toward the thrower and also having a particular portion adjacent the periphery thereof around which said belt travels and located generally in vertical register with said thrower pivot axis, the length of belt travel from said drive sheave and around said idlers remaining substantially constant when the thrower swings laterally whereby the drive to the thrower is unimpaired by such swinging, and means spaced and separate from said idler axes so mounting each idler on said thrower that the plane in which each idler rotates changes upon lateral swinging of the thrower and provides proper operative engagement of said belt with the idlers.

References Cited in the file of this patent

UNITED STATES PATENTS 3,096,962  Hollyday _____ July 2, 1962